(12) United States Patent
Liu et al.

(10) Patent No.: US 7,827,398 B2
(45) Date of Patent: Nov. 2, 2010

(54) METHOD FOR OFFLOADING ENCRYPTION AND DECRYPTION OF A MESSAGE RECEIVED AT A MESSAGE SERVER TO REMOTE END DEVICES

(75) Inventors: Xiufen Liu, Lisle, IL (US); John Poplett, River Forest, IL (US); Arun Singh, Fremont, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 1340 days.

(21) Appl. No.: 11/260,728

(22) Filed: Oct. 27, 2005

(65) Prior Publication Data

US 2007/0101133 A1    May 3, 2007

(51) Int. Cl.
*H04L 29/06* (2006.01)
*H04L 9/32* (2006.01)

(52) U.S. Cl. ............ 713/153; 713/160; 713/161; 713/163; 713/169; 713/170; 713/171; 713/182; 726/2; 726/3; 726/4; 726/12; 726/13; 726/14; 726/15; 726/26; 726/27; 726/29; 726/30; 380/255; 380/257; 380/259; 380/277; 380/282

(58) Field of Classification Search ............. 713/153, 713/170–171; 380/255
See application file for complete search history.

(56) References Cited

U.S. PATENT DOCUMENTS

| | | | | |
|---|---|---|---|---|
| 5,594,797 A * | 1/1997 | Alan ar a et al. | ............... | 380/28 |
| 5,999,525 A * | 12/1999 | Krishnaswamy et al. | .... | 370/352 |
| 6,404,764 B1 * | 6/2002 | Jones et al. | ................. | 370/352 |
| 6,741,705 B1 * | 5/2004 | Nelson et al. | ............... | 380/257 |
| 7,382,882 B1 * | 6/2008 | Immonen | ..................... | 380/270 |
| 2002/0129236 A1 * | 9/2002 | Nuutinen | ..................... | 713/151 |
| 2003/0021416 A1 | 1/2003 | Brown et al. | ............... | 380/277 |
| 2003/0028699 A1 * | 2/2003 | Holtzman et al. | ........... | 710/301 |
| 2004/0029562 A1 * | 2/2004 | Sharon et al. | ............... | 455/410 |
| 2005/0201363 A1 * | 9/2005 | Gilchrist et al. | ............. | 370/352 |
| 2006/0078110 A1 * | 4/2006 | Kim et al. | ..................... | 380/30 |
| 2006/0218636 A1 * | 9/2006 | Chaum | ........................ | 726/22 |

OTHER PUBLICATIONS

Ahmar Ghaffar, How Secure is VoIP?, http://www.tmcnet.com/voip/1104/FeatureSecurity.htm, Nov. 2004.

(Continued)

*Primary Examiner*—Edan Orgad
*Assistant Examiner*—Jenise E Jackson

(57) ABSTRACT

A method for offloading encryption and decryption of a message received at a message server to one or more end devices that are remote from the message server. An encrypting end device remote from the message server encrypts a message using cryptographic context and transmits the cryptographic context and encrypted message to the message server for storage at the message server. The message server stores the encrypted message as received without decrypting the message. The message server sends the stored cryptographic context and the encrypted message to a decrypting end device in response to the decrypting end device sending a request for the message server to transmit the encrypted message to the decrypting end device. The decrypting end device uses the cryptographic context to decrypt the encrypted message and then presents the decrypted message to a user of the decrypting end device.

19 Claims, 4 Drawing Sheets

OTHER PUBLICATIONS

3COM® 3102 Business IP Phone—Designed for Cost-Effective High Performance, http://www.3com.com/voip/ip-phone-3102.html, printed from the World Wide Web on Apr. 15, 2005.

SIP VoIP Gateway—2 Port Terminal Adapter, http://www.azatel.com/azaCall.htm, printed from the World Wide Web prior to Oct. 27, 2005.

Debbie Greenstreet et al., Building Residential VoIP Gateways: A Tutorial, Part Four: VoIP Security Implementation, http://www.analogzone.com/nett0913.pdf, printed from the World Wide Web on Oct. 27, 2005.

M. Baugher, RFC 3711, The Secure Real-Time Transport Protocol (SRTP), Mar. 2004.

3COM® Gigabit Etherlink® Server Network Interface Card, http://www.3com.com/products/en/US/printsafe.jsp?sku=3C985-SX&pathtype=support, printed from the World Wide Web on Apr. 18, 2005.

3COM® VCX™ Digital VoIP Gateways, http://www.3com.com/other/pdfs/products/en_US/3Com-400929.pdf, printed from the World Wide Web on Oct. 27, 2005.

* cited by examiner

METHOD FOR OFFLOADING ENCRYPTION AND DECRYPTION OF A MESSAGE RECEIVED AT A MESSAGE SERVER TO REMOTE END DEVICES

BACKGROUND

1. Field of Invention

The present invention relates to the communication of messages and, more particularly, to the encryption and decryption of messages being communicated.

2. Description of Related Art

Voice mail messaging is a popular means for communicating messages. Voice mail messaging allows a caller to store (i.e., record) a voice mail message at a message server. The voice mail message is stored for a called party. Voice mail messaging allows a called party to retrieve voice mail messages that have been stored at the message server for the called party.

Communication of voice mail messages typically occurs by way of two separate phone calls. A first phone call is placed from a caller to a called party or from the caller directly to a message server. If the called party does not answer the first phone call or if the called party's telephone line is busy, the first phone call is forwarded to the message server. A telephone call to the message server allows the caller to store a voice mail message for the called party. A second phone call placed by the called party to the message server allows the called party to retrieve the stored message.

A major concern with voice mail messaging is how to secure voice mail messages during transmission of the messages and while the messages are stored in data storage, so that an unauthorized person cannot access and listen to a called party's messages. Transmission of a voice mail message occurs (i) during the first phone call when the message is transmitted from the caller's telephone to the message server, and (ii) during the second phone call when the message is transmitted from the message server to the called party's telephone. Storage of the voice mail message occurs after transmission of the message to the message server and at least until the called party places the second phone call.

One method for securing voice mail messages at a voice mail system comprises (i) receiving a voice mail message from a caller, (ii) encrypting the voice mail message as the message is received at the voice mail system, and (iii) storing in a memory device, the voice mail message encrypted by the voice mail system. Thereafter, when a user (i.e., a called party) selects to receive the encrypted voice mail message stored in the memory device, the voice mail system (i) decrypts the selected message, and then (ii) sends the decrypted message to the user.

Performing encryption of messages received at a voice mail system and performing decryption of messages to be sent from the voice mail system to a called party requires processing resources of a processor within the voice mail system. If the voice mail system has to encrypt and/or decrypt too many messages at any given time while the voice mail system is receiving one or more messages, the voice mail system may fail to properly record the one or more received messages or may experience other failures due, in part, to the processing burden imposed on the processor by encrypting and decrypting messages.

In the past, voice mail systems (or other messaging systems) would typically be designed with increased processing resources to handle the processing burden imposed by encrypting and decrypting a large amount of messages. The inventors have discovered that it would be beneficial to reduce the burden imposed on a processor of a voice mail system (or other messaging system) by reducing the processing burden associated with encrypting and decrypting messages at the voice mail system (or other messaging system) so as to reduce the amount of processing resources required at the voice mail system (or other messaging system).

SUMMARY

The present invention advances over the existing art by providing a mechanism for offloading encryption and decryption of a message received at a message server to one or more end devices that are remote from the message server.

An exemplary embodiment of the present invention may be carried out as a method that includes: (i) at a message server, receiving a cryptographic context associated with a message encrypted with the cryptographic context, and responsively storing the cryptographic context, (ii) at the message server, receiving the encrypted message and responsively storing the encrypted message, (iii) at the message server, receiving a request for the message server to transmit the encrypted message to a decrypting end device, and (iv) in response to receiving the request, transmitting the cryptographic context and the encrypted message to the decrypting end device, for decryption of the encrypted message by the decrypting end device.

Another exemplary embodiment of the present invention carried out as a method is a method that includes: (i) at a message server, receiving, from an encrypting end device via a packet-network, a cryptographic context associated with a message encrypted with the cryptographic context, and responsively storing the cryptographic context, (ii) at the message server, receiving the message encrypted with the cryptographic context from the encrypting end device via the packet-network and responsively storing the encrypted message, (iii) at the message server, receiving, from the decrypting end device via the packet-network, a request for the message server to transmit the encrypted message to the decrypting end device, and (iv) in response to receiving the request, transmitting the cryptographic context and the encrypted message to the decrypting end device, for decryption of the encrypted message by the decrypting end device. In accordance with this exemplary embodiment, the message server, the encrypting end device, and the decrypting end device, are all coupled to the packet-network. Further, in accordance with this exemplary embodiment, storing the encrypted message includes storing the encrypted message as encrypted by the encrypting end device.

Yet another exemplary embodiment of the present invention carried out as a method is a method that includes: (i) a message server negotiating with an encrypting end device to establish a first secure communication path, (ii) at the message server, receiving, via the first secure communication path, a cryptographic context associated with a message encrypted with the cryptographic context, and responsively storing the cryptographic context, (iii) at the message server, receiving the message encrypted with the cryptographic context from the encrypting end device and responsively storing the encrypted message, (iv) the message server negotiating with a decrypting end device to establish a second secure communication path, (v) at the message server, receiving a request for the message server to transmit the encrypted message to the decrypting end device, and (vi) in response to receiving the request for transmission of the stored encrypted message, transmitting the cryptographic context to the decrypting end device via the second secure communication path and transmitting the encrypted message to the decrypting end device, for decryption of the encrypted message by the decrypting end device. In accordance with this exemplary embodiment, the first secure communication path is between the message server and the encrypting end device, and the second secure communication path is between the message server and the decrypting end device.

Still yet another exemplary embodiment of the present invention carried out as a method is a method that includes: (i) at a message server, receiving a cryptographic context used to encrypt a message in real-time as the message is being created, and responsively storing the cryptographic context, (ii) at the message server, receiving the encrypted message and responsively storing the encrypted message, (iii) at the message server, receiving a request for the message server to transmit the encrypted message to a decrypting end device, and (iv) in response to receiving the request, transmitting the cryptographic context and the encrypted message to the decrypting end device, for decryption of the encrypted message by the decrypting end device.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF DRAWINGS

Exemplary embodiments of the present invention are described herein with reference to the drawings, in which.

DETAILED DESCRIPTION

1. Overview

The present invention advances over the prior art by providing a mechanism for offloading encryption and decryption of a message received at a message server to one or more end devices that are remote from the message server. In this way, encryption and decryption of the message is offloaded from the message server to the one or more end devices. Offloading encryption and decryption of the message, from the message server to the one or more end devices, can reduce the processing burden of the message server. As a result, a message server may require less processing resources or the message server can use its processing resources to carry out functions other than encrypting and/or decrypting messages.

2. Exemplary Architecture

Figure 1:
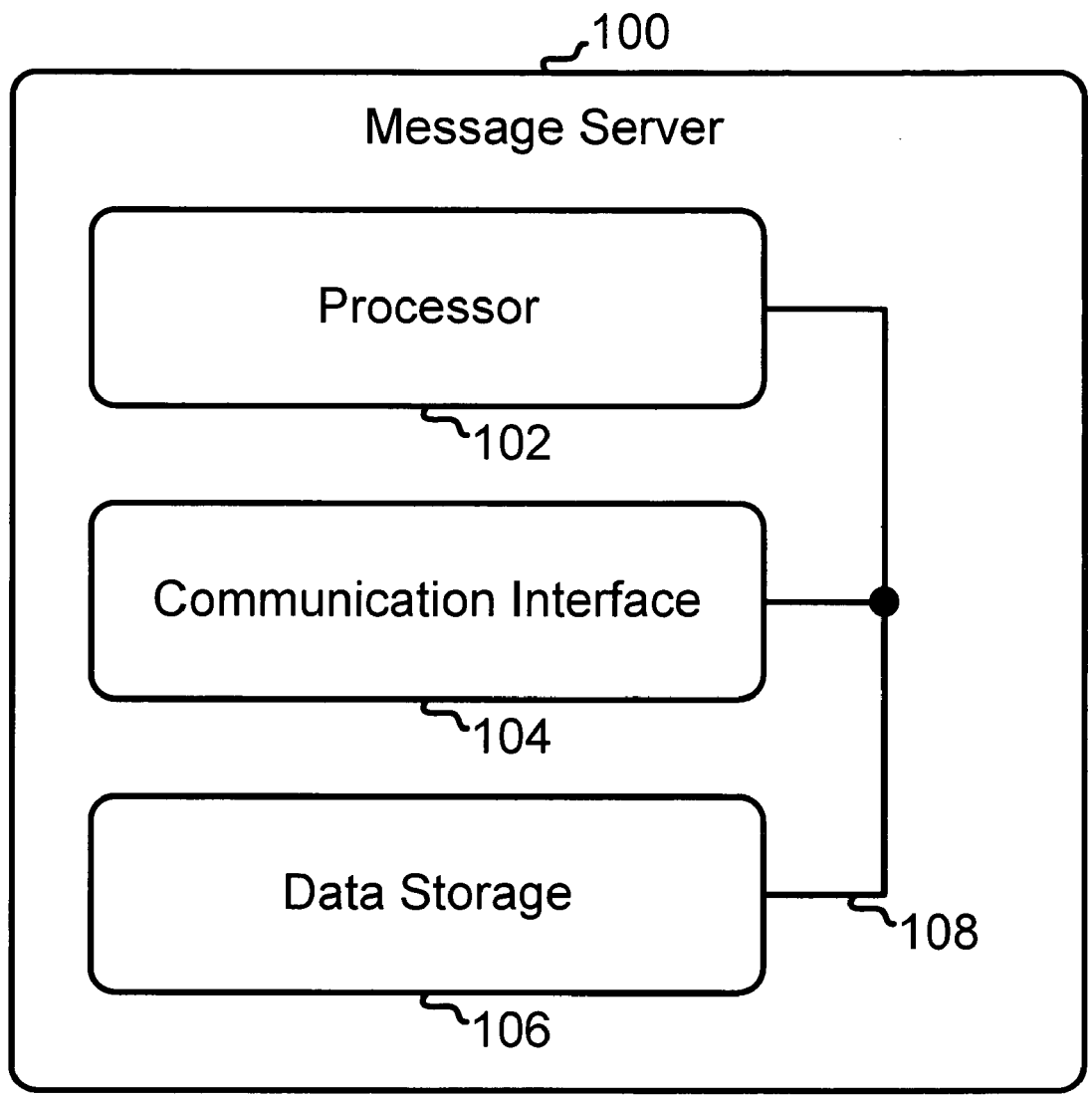
FIG. 1 is a simplified block diagram illustrating a message server in which an exemplary embodiment of the present invention can be implemented.

Referring to the drawings, in accordance with an exemplary embodiment, FIG. 1 depicts a simplified block diagram of a message server 100 for use in offloading encryption and decryption of a message received at a message server to one or more end devices remote from the message server. The message server 100 includes a processor 102, a communication interface 104, and data storage 106, all linked together via a system bus, network, or other connection mechanism 108.

It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location The processor 102 can comprise one or more processors, such as a general purpose processor and/or a digital signal processor. The processor 102 can work cooperatively with the connection mechanism 108 so that the processor 102 can (i) receive data from the communication interface 104 and/or from the data storage 106, and (ii) send data to the communication interface 104 and/or to the data storage 106. The processor 102 can also work cooperatively with the connection mechanism 108 so as to receive data from (and send data to) other devices within the message server 100. These other devices of the message server 100 are not shown for clarity purposes of describing this exemplary embodiment.

Figure 4:
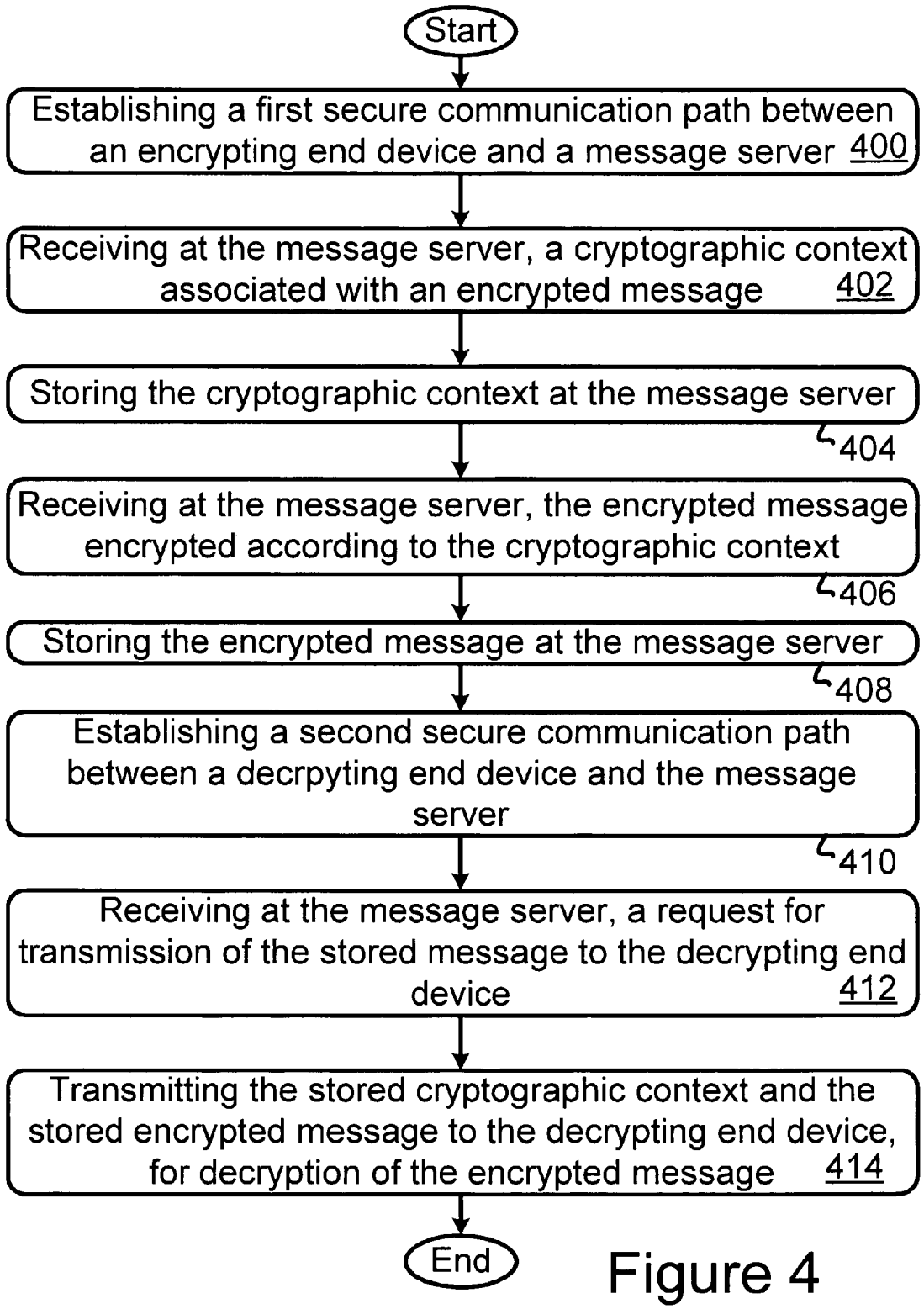
FIG. 4 is a flow chart depicting functions that can be carried out in accordance with an exemplary embodiment of the present invention.

The processor 102 can read computer-readable (i.e., machine-readable) program instructions stored at the data storage 106 and can execute the computer-readable program instructions so as to carry out the functions described herein, such as the functions described with respect to FIG. 4.

The communication interface 104 provides an interface to one or more networks external to the message server 100 and provides an interface to the connection mechanism 108. Examples of the one or more external networks are described below with respect to FIG. 3. The communication interface 104 can provide a wired and/or a wireless interface to the one or more external networks so that the communication interface 104 can send data to the one or more external networks and/or receive data from the one or more external networks. The communication interface 104 can send data to the connection mechanism 108 for transmission of the data to another portion of the message server 100. The communication interface 104 can receive data sent from another portion of the message server 100 to the communication interface 104 via the connection mechanism 108.

The communication interface 104 may be arranged as a network interface card (NIC). In this regard, the NIC may (i) convert signals received via the connection mechanism 108 to more powerful signals necessary for transmission of the signals via an external network, and (ii) convert signals received from an external network into signals suitable for transmission via portions of the connection mechanism 108. An example of the communication interface 104 is a 3Com® Gigabit Etherlink® Server NIC, product number 3C985B-SX, sold by 3Com Corporation, Marlborough, Mass., 01752-3064. Other examples of the communication interface 104 are also possible.

The data storage 106 may comprise a computer-readable storage medium such as a magnetic disc, an optical disc, organic memory, and/or any other volatile or non-volatile mass storage system readable by the processor 102. Alternatively, the data storage 106 may comprise a combination of computer-readable storage media. For example, the data storage 106 may comprise a first computer-readable storage medium located within the processor 102 and a second computer-readable storage medium that is located remote from the processor 102. Other examples of computer-readable storage medium and other examples of computer-readable storage media combinations are also possible.

Figure 2:
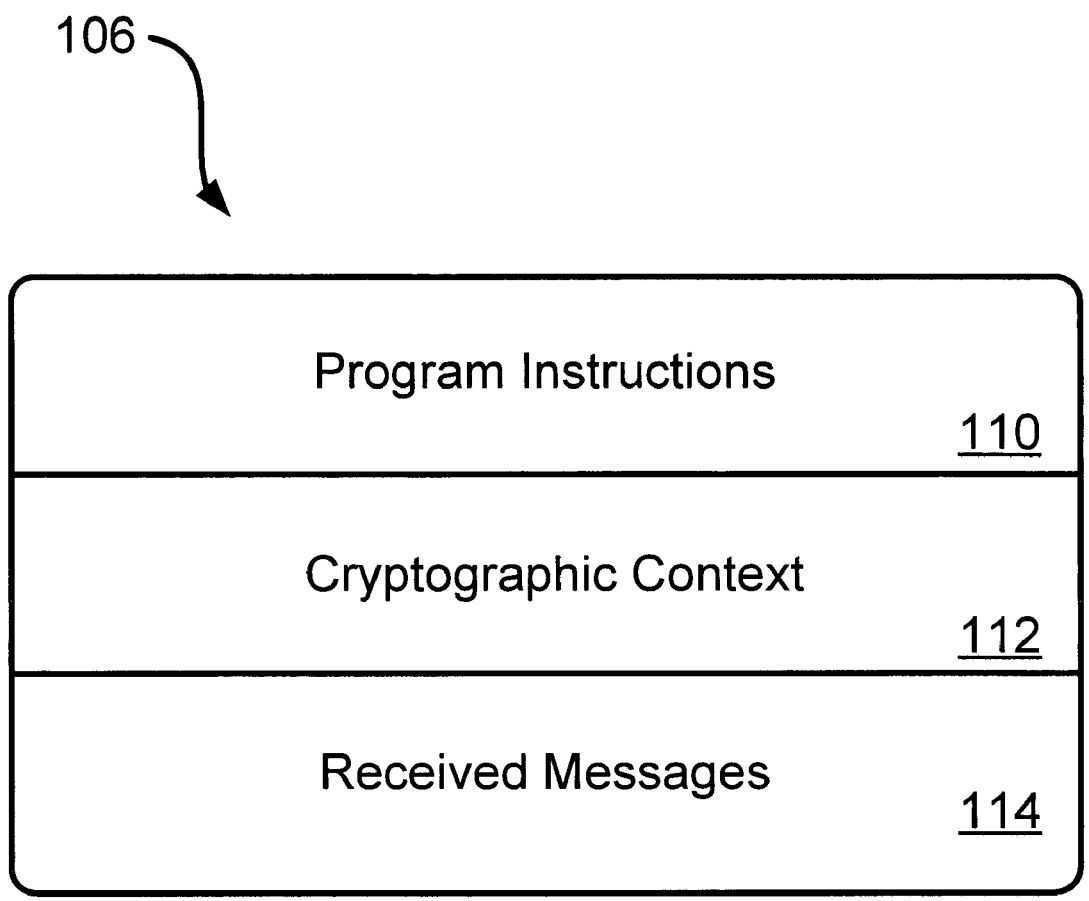
FIG. 2 is a simplified block diagram depicting content of a data storage device in a message server in which an exemplary embodiment of the present invention can be implemented.

The data storage 106 provides means for storing computer-readable data. Examples of computer-readable data that can be stored in the data storage 106 are described herein with reference to FIG. 2. As shown in FIG. 2, the data storage 106 can store program instructions 110, cryptographic context 112, and received messages 114. Other examples of computer-readable data that can be stored in the data storage 106 are also possible.

The program instructions 110 are computer-readable program instructions executable by the processor 102. By executing the program instructions 110, the processor 102 can carry out functions described herein. For example, the program instructions 110 may include instructions executable by the processor 102 that cause the processor 102 to request the communication interface 104 or the data storage 106 to transmit data to the processor 102. In this way, the processor 102 can receive a cryptographic context, an encrypted message, or other data located at the data storage 106 or the communication interface 104. As another example, the program instructions 110 may include instructions executable by the processor 102 that cause the processor 102 to transmit data to the communication interface 104 and/or to the data storage 106.

As another example, the program instructions 110 may include instructions executable by the processor 102 that cause the communication interface 104 to send an encrypted message and at least a portion of a cryptographic context to a packet-network for transmission, in turn, to a decrypting end device. In accordance with this example, the processor 102 may execute these program instructions in response to the message server 100 receiving a request to transmit the encrypted message to the decrypting end device. In some cases, only a portion of the cryptographic context may be sent to the decrypting end device, such as when the decrypting device only requires a portion of the cryptographic context to decrypt an encrypted message.

As yet another example, the program instructions 110 may include instructions executable by the processor 102 that cause the processor 102 to encrypt at least a portion of a cryptographic context (e.g., an encryption/decryption key). Execution of the program instructions to encrypt at least a portion of the cryptographic context may occur before the cryptographic context is stored in the data storage 106 so that at least a portion of the cryptographic context stored in the data storage 106 is encrypted.

As still yet another example, the program instructions 110 may include instructions executable by the processor 102 that cause the processor 102 to work cooperatively with the data storage 106 to perform functions at the data storage 106. The functions performed at the data storage 106 may include (i) storing an encrypted message and a cryptographic context associated with the encrypted message at a given address(es) within the data storage 106, or (ii) storing in the data storage 106, correlation data that links an encrypted message to a cryptographic context, or (iii) sending a cryptographic context and an encrypted voice mail message from the data storage 106 to the communication interface 104 for transmission, in turn, to a packet-network. Other examples of the program instructions 110, such as program instructions to carry out other functions described herein, are also possible.

The received messages 114 may comprise a variety of messages. As an example, the received messages 114 may include one or more voice messages, one or more video messages, and/or one or more text messages. Each of the received messages 114 may be addressed to a given party that has an account (e.g., a voice-mail message account) for storing messages at the message server 100. Other examples of the various messages of the received messages 114 are also possible.

Moreover, each of the received messages 114 may comprise a message that is encrypted at an encrypting end device that is located remote from the message server 100. The encrypting end device may encrypt a message after the message has been created. Alternatively, the encrypting end device may encrypt the message as the message is being created (i.e., in real-time). Real-time means immediate, as an event is occurring. For example, an encrypting end device may encrypt a voice message as a user speaks the message. The encrypting end device can transmit the encrypted voice message in real-time to the message server 100, as well as, receive a voice message in its entirety, then encrypt the voice message, and then transmit the encrypted voice message to the message server 100. The message server 100 may receive a first portion of the encrypted message while a second portion of the message is being encrypted. The message server 100 receiving the encrypted message, as well as the encrypting end device, may be arranged to perform communication of the encrypted message using a Real-Time Streaming Protocol (RTSP).

The cryptographic context 112 comprises security data that is associated with the received messages 114 or a portion of the received messages 114. A given message received at the message server 100 may be associated with a unique cryptographic context that is used to encrypt the given message. The cryptographic context associated with the given message may be transmitted to the message server 100 (i) prior to transmission of the given message, (ii) within the given message, (iii) between a first part of the given message and a second part of the given message, and/or (iv) after transmission of the given message to the message server.

As an example, a unique cryptographic context associated with the given message (or a portion of a message) may include an encryption scheme identifier that identifies the method used to encrypt the given message. An encryption scheme identifier may be arranged in various ways, such as a single data bit within the cryptographic context. In this regard, for example, if the single data bit equals zero, then the encryption scheme is the Data Encryption Standard (DES), and if the single data bit equals one, then the encryption scheme is the Triple DES. Other examples of arranging an encryption scheme identifier within a cryptographic context and other examples of encryption schemes are also possible.

As another example, a unique cryptographic context associated with the given message or a portion of a message may include one or more encryption/decryption keys. Preferably, each encryption/decryption key is randomly generated and used to encrypt and/or decrypt only one message or one portion of a message. Each encryption/decryption key may be arranged as a symmetric key that is used for both encrypting and decrypting a message or a portion of a message. Thus, in some cases, two or more encryption/decryption keys may be used encrypt and decrypt a single message.

As yet another example, a unique cryptographic context associated with the given message or a portion of a message may include an encryption/decryption key arranged as public key for encrypting a message or portion of a message. The public key may be stored at the message server 100 and sent to the encrypting end device when the encrypting end device connects to the message server 100. The public key may be sent to the encrypting end device in response to the encrypting end device requesting that the message server send a public key to the encrypting end device. After receiving the public key, the encrypting end device can encrypt a message or a portion of a message with the public key. A decrypting end device that receives the message or the portion of the message encrypted with the public key can use a private key to decrypt the message. The private key may be accessible only to the decrypting end device that receives the message encrypted with the public key. The decrypting end device could receive the private key from the message server or another device, or could be pre-programmed with the private key. Other examples of a unique cryptographic context that can be used to encrypt a message are also possible.

As still yet another example, a unique cryptographic context associated with the given message (or a portion of a message) may include a salt value. A salt value is random data that can be transmitted with an encryption/decryption key to increase the amount of work required by a person (or machine) trying to identify an encryption/decryption key so that the person (or machine) can decrypt a message that is encrypted using the encryption/decryption key. The salt value may comprise a salt value that is generated by the encrypting end device and that is sent with encryption/decryption key from (i) the encrypting end device to the message server, and (ii) from the message server to a decrypting end device.

Alternatively, the salt value may comprise (i) a first salt value that is generated by the encrypting end device and that is sent with encryption/decryption key from the encrypting end device to the message server, and (ii) a second salt value that is generated by the message server 100 and that is sent with encryption/decryption key from the message server 100 to a decrypting end device. Other examples of generating and transmitting salt values of a cryptographic context, and other examples of data that may be included in a cryptographic context are also possible.

In addition to the program instructions 110, the cryptographic context 112, and the received messages 114, the data storage 106 can store other types of computer-readable data. For example, the data storage 106 can store computer-readable data arranged as correlation data that correlates an encrypted message of the received messages 114 to a cryptographic context used to encrypt the encrypted message stored in the data storage 106. In this way, the correlation data can be used to locate and retrieve the cryptographic context correlated with the encrypted message in preparation for sending the cryptographic context and the encrypted message to a decrypting end device that requests the encrypted message be transmitted to the decrypting end device. Other examples of computer-readable data that can be stored in the data storage 106 are also possible.

Figure 3:
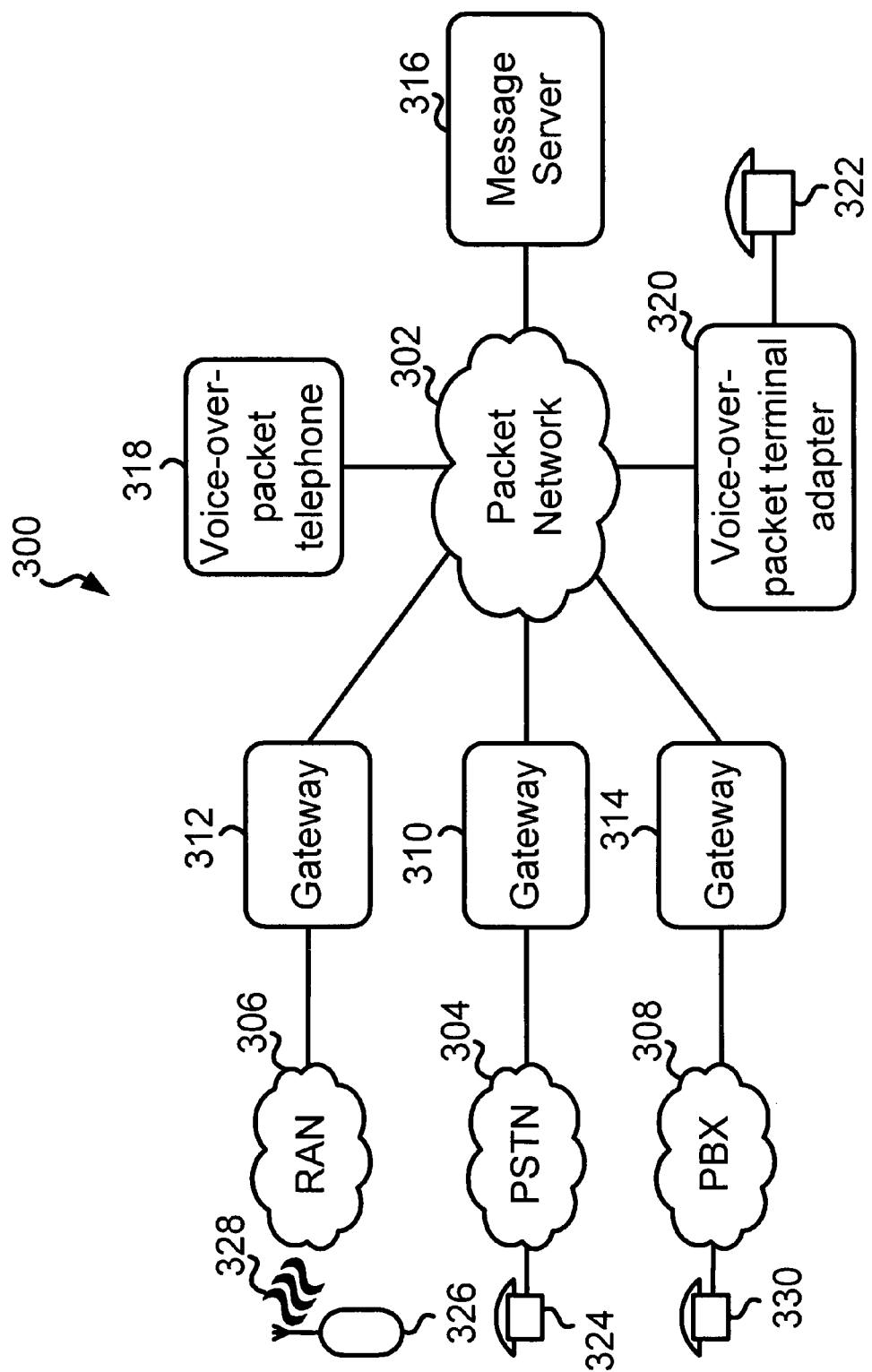
FIG. 3 is a simplified block diagram illustrating network architecture for carrying out the offloading of encryption and decryption of a message received at a message server to one or more end devices remote from the message server, in accordance with an exemplary embodiment of the present invention.

Next, FIG. 3 depicts network architecture 300 for carrying out encryption and decryption of a message received at a message server to one or more end devices remote from the message server in accordance with an exemplary embodiment of the present invention. As shown in the figure, the network architecture 300 includes four interconnected networks, i.e., a packet-network 302, a Public Switched Telephone Network (PSTN) 304, a Radio Access Network (RAN) 306, and a private branch exchange (PBX) 308. Alternatively, the network architecture 300 may comprise some number of networks other than three networks, as well as a different combination of networks or a single network.

The packet-network 302 may comprise a single packet-network or a combination of two or more packet-networks. The two or more packet-networks combined to form the packet-network 302 may be (i) the same type of network, or (ii) different types of networks interconnected by a packet-network gateway. A packet-network gateway translates data packets sent over a first type of network to data packets sent over a second type of network. Examples of networks that may be arranged to form the packet-network 302 include Local Area Networks (LANs), Wide Area Networks (WANs), Metropolitan Area Networks (MANs), X.25 networks, frame relay networks, and synchronous optical networks (SONETs). Further, the packet-network 302 may comprise the Internet. Other examples of networks that may be arranged to form the packet-network 302 are also possible.

The packet-network 302 is coupled to a first gateway 310, a second gateway 312, a third gateway 314, a message server 316, a voice-over-packet telephone 318, and a voice-over-packet terminal adapter 320. One or more wired connections and/or one or more wireless connections may be used to couple each of the first gateway 310, the second gateway 312, the third gateway 314, the message server 316, the voice-over-packet telephone 318, and/or the voice-over-packet terminal adapter 320 to the packet-network 302.

The packet-network 302 provides for sending data arranged in packets (i.e., data packets) from a first device coupled to the packet-network 302 (e.g., the voice-over-packet telephone 318) to a second device coupled to the packet-network 302 (e.g., the message server 316). Individual data packets addressed to a given address (e.g., the address of the message server 316) can be sent to the given address via different routes within the packet-network 302. Voice over Internet Protocol (VoIP) technology may be used to transmit packets that comprise encoded speech through the packet-network 302.

The message server 316 may be arranged in various configurations. The message server 316 may be arranged as the message server 100 shown in FIG. 1. Alternatively, or in combination, the message server 316 may be arranged to include the data storage 106 shown in FIG. 2. The message server 316 may be arranged to carry out the functions described herein, such as the functions shown in the flowchart of FIG. 4.

The voice-over-packet telephone 318 (e.g., a VoIP telephone) is a telephone that comprises a network interface for interfacing to the packet-network 302. The network interface of the voice-over-packet telephone 318 can be arranged as a NIC that communicates via the packet-network 302 by sending data packets directly to the packet-network 302 and/or by receiving data packets directly from the packet-network 302. The data packets sent to and from the voice-over-packet telephone 318 may include (i) data packets that contain a message (e.g., a Session Initiation Protocol (SIP) message) for establishing a communication session, and (ii) data packets (e.g., Real-time Transfer Protocol (RTP) data packets) that contain message content. The data packets that contain message content may contain a voice mail message. Other examples of data packet content and/or protocols used for sending data packets to and from the voice-over-packet telephone 318 are also possible.

The voice-over-packet telephone 318 may be arranged in various configurations. For example, the voice-over-packet telephone 318 may be arranged as a personal computer (P.C.) coupled to the packet-network 302 via a network interface (e.g., a NIC). According to this example, the P.C. may couple to one or more peripheral devices (e.g., a microphone and speaker) so that a user may engage in voice communications via the P.C. As another example, the voice-over-packet telephone 318 may be arranged as a packet-network telephone such as a 3Com® 3102 Business IP Phone manufactured by 3Com® Corporation of Marlborough, Mass. 01752-3064. Other examples of the voice-over-packet telephone 318 are also possible.

The voice-over-packet terminal adapter 320 is a gateway that provides connection interface between the packet-network 302 and a device coupled to the voice-over-packet terminal adapter 320. An example of the voice-over-packet terminal adapter 320 is the AzaCall200™ 2 port SIP VoIP Terminal Adapter sold by AzaTel Communications Inc. of Vancouver, British Columbia, Canada. Other examples of the voice-over-packet terminal adapter 320 are also possible.

The voice-over-packet terminal adapter 320 can couple one or more devices to a packet-network. For example, the voice-over-packet terminal adapter 320 can couple a first traditional circuit-switched telephone 322 to the packet-network 302. In this way, the first circuit-switched telephone 322 can perform communications via the packet-network 302 without connecting to a circuit-switched network such as the PSTN 304. Other examples of devices that can couple to the voice-over-packet terminal adapter 320 are also possible.

The PSTN 304 is coupled to the first gateway 310 and to a second traditional circuit-switched telephone 324. The second circuit-switched telephone 324 (like the first circuit-switched telephone 322) may be a traditional landline telephone that performs telephone communications using analog signals that represent spoken communication. The PSTN 304 may convert the analog signals sent from the second circuit-switched telephone 324 to digital signals (e.g., Pulse Code Modulated (PCM) signals) for transmission throughout at least a portion of the PSTN 304.

The PSTN 304 provides a designated circuit between two points for the duration of a telephone call. For example, the PSTN 304 may provide a designated circuit between the second circuit-switched telephone 324 and the first gateway 310 during a telephone call placed from the second circuit-switched telephone 324 to another device, such as the voice-over-packet telephone 318. In contrast, the packet-network 302 may transmit data packets from the first gateway 310 to the other device over one or more routes within the packet-network 302. In this regard, the packet-network 302 may not provide a designated circuit between two points within the packet-network 302.

The first gateway 310 provides a connection interface to the PSTN 304 and to the packet-network 302. The first gateway 310 may include one or more connections to the PSTN 304 and one or more connections to the packet-network 302. The first gateway 310 may provide a connection interface to one or more other networks, such as the PBX 308 and/or a private LAN.

The first gateway 310 may be arranged in various configurations. For example, the first gateway 310 (as well as the second gateway 312 and/or the third gateway 314) may comprise (i) a gateway controller (i.e., a "softswitch"), and (ii) one or more media gateways coupled to the gateway controller. A gateway controller converts network signaling data used in a first network (e.g., Signaling System No. 7 (SS7) signals used in the PSTN 304) to signaling data used in a second network (e.g., SIP signals used in the packet-network 302). A media gateway converts media in a first form as transmitted in a first network (e.g., media arranged as PCM signals transmitted in the PSTN 304) to media in a second form as transmitted in a second network (e.g., media arranged as RTP signals transmitted in the packet-network 302).

As another example, the first gateway 310 may be arranged as a 3Com VCX™ 7122 digital media gateway that is produced by the 3Com Corporation of Marlborough, Mass. 01752-3064. Other examples of arrangements for the first gateway 310 are also possible.

The RAN 306 provides interface to a wireless communication device 326 (e.g., a wireless cellular phone). The interface between the RAN 306 and the wireless communication device 326 is a radio frequency (RF) air interface 328. The air interface 328 may carry communications between the RAN 306 and the wireless communication device 326 according to any of a variety of air interface protocols. Examples of air interface protocols include the Code Division Multiple Access (CDMA) protocol, the Global System for Mobile Communications (GSM) protocol, and the Universal Mobile Telecommunications Service (UMTS) protocol.

The second gateway 312 provides connection interface to the RAN 306 and to the packet-network 302. The wireless communication device 326 may establish a data link (e.g., a point-to-point protocol (PPP) link) with the second gateway 312. In this regard, the second gateway 312 may be arranged as a Packet Data Serving Node (PDSN) that establishes, maintains, and terminates PPP links.

After establishing a data link between the wireless communication device 326 and the second gateway 312, the wireless communication device 326 can function to establish a communication session with message server 316 via the packet-network 302 to securely communicate messages by employing the functions described below with respect to FIG. 4.

Alternatively, after establishing the data link between the wireless communication device 326 and the second gateway 312, the wireless communication device 326 can establish a communication session with a remote gateway (not shown) within the packet-network 302. The remote gateway can function to securely communicate messages by employing the functions described below with respect to FIG. 4. By way of example, the remote gateway may include (i) a gateway controller to convert call signals sent from the wireless communication device 326 to SIP signals for transmission to the message server 316 via the packet-network 302, and (ii) a media gateway to convert voice signals sent from the wireless communication device 326 to RTP signals for transmission to the message server 316 via the packet-network 302.

The PBX 308 provides a connection interface to a PBX-network telephone 330. Various arrangements for the PBX-network telephone 330 are possible. For example, the PBX-network telephone 330 may be arranged as a traditional circuit-switched telephone that performs analog communications to devices within the PBX 308. As another example, the PBX-network telephone 330 may be arranged to perform digital communications, such as voice-over-packet communications, within the PBX 308. Other examples of arrangements for the PBX-network telephone 330 are also possible.

The third gateway 314 provides a connection interface to the PBX 308 and to the packet-network 302. The third gateway 314 may include one or more connections to the PBX 308 and one or more connections to the packet-network 302. The third gateway 314 may provide a connection interface to one or more other networks, such as to the PSTN 304 and/or to a private LAN.

In accordance with an exemplary embodiment, the network architecture 300 provides for carrying out encryption and decryption of a message received at a message server to one or more end devices remote from the message server. As an example, the one or more end devices remote from the message server 316 may be arranged as the voice-over-packet telephone 318, the voice-over-packet terminal adapter 320, the first gateway 310, the second gateway 312, the third gateway 314, the first circuit-switched telephone 322, the second circuit-switched telephone 324, the wireless communication device, or the PBX-network telephone 330. Other examples of the one or more end devices that are remote from the message server 316 are also possible.

3. Exemplary Operation

FIG. 4 is a flow chart provided to illustrate some of the functions that may be carried out with an exemplary embodiment of the present invention. The elements shown in FIGS. 1-3 are used to describe these functions. The functions shown in FIG. 4 may be carried out sequentially from top to bottom as shown in the figure or according to another sequence. Alternatively, in accordance with another exemplary embodiment, two or more of these functions may be carried out in combination, and/or one or more of these functions may be omitted.

As shown in FIG. 4, block 400 includes establishing a first secure communication path between an encrypting end device and a message server. The first secure communication path may be arranged according to any of a variety of protocols for establishing a secure communication path. For example, the first secure communication path may be arranged as a Transport Layer Security (TLS) secure communication path that is arranged according to a TLS protocol known to those skilled in the art. As another example, the first secure communication path may be arranged as a Virtual Private Network (VPN) that allows data to be tunneled between the message server and the encrypting end device. Other examples of arrangements for establishing the first secure communication path are also possible.

The encrypting end device comprises means for (i) initiating establishment of the first secure communication path, (ii) encrypting a message according to a cryptographic context, and (iii) transmitting the encrypted message and/or the cryptographic context to the message server via the first secure communication path or a non-secure communication path. The encrypting end device may be arranged for encrypting the message according to the cryptographic context. Various devices may function as the encrypting end device. For example, the encrypting end device may be arranged as (i) the first gateway 310, (ii) the voice-over-packet telephone 318, or (iii) the voice-over-packet terminal adapter 320. Other examples of devices that may function as the encrypting end device are also possible.

The encrypting end device and the message server can each comprise means for negotiating the establishment of the first secure communication path. Negotiations to establish the first secure communication path can take place between the encrypting end device and the message server. As an example, the negotiations may be carried out by communicating TLS protocol messages between the encrypting end device and the message server.

The encrypting end device may initiate establishing the first secure communication path in response to receiving signals sent from a first remote telephone device. The first remote telephone device may send (i) signals addressed to a called party in an attempt to establish a communication session with the called party, and/or (ii) signals addressed to a message server where the called party has a voice mail account. Examples of the first remote telephone device include the first circuit-switched telephone 324 and the wireless communication device 326.

Preferably, the first secure communication path is established prior to transmission of the cryptographic context from the encrypting end device to the message server. In this way, the cryptographic context may be sent to the message server via the first secure communication path.

A first communication session is established between the message server and the encrypting end device. Preferably the first communication session is established after first secure communication path is established. Establishing the first communication session may occur by communicating signaling protocol messages between the message server and the encrypting end device. By way of examples, the signaling protocol messages used to establish the first communication session may comprise SIP messages or H.323 protocol messages. Other examples of signaling protocol messages used to establish the first communication session are also possible.

Next, block 402 includes receiving at the message server, a cryptographic context that is associated with an encrypted message. The encrypting end device may generate the cryptographic context that is used to encrypt a message so as to create the encrypted message. The message encrypted according to the cryptographic context may comprise any of a variety of messages. For example, the message may comprise a voice message (e.g., a voice-mail message) arranged as encoded speech. As another example, the message may comprise a video message and/or a video/audio message. As yet another example, the message may comprise a visual text message. Each of these exemplary messages is arranged as computer-readable data that can be converted to media (e.g., voice media, video media, or text media) for presentation via a user interface (e.g., a speaker and/or display) at a decrypting end device. Other examples of the message encrypted according to the cryptographic context are also possible.

The encrypting end device transmits the cryptographic context to a communication path for transmission of the cryptographic context to the message server via the communication path. Preferably, the communication path that carries the cryptographic context comprises the first secure communication path (established at block 400 above). Transmission of the cryptographic context through the communication path may occur according to any of a variety of transport protocols. For example, transmission of the cryptographic context may occur according to the TLS protocol. Alternatively, for example, the transmission of the cryptographic context may occur according to a Secure Real-time Transport Protocol (SRTP). Other examples of transport protocols used to transmit the cryptographic context are also possible.

The message server 100 may receive the cryptographic context at the communication interface 104 of the message server 100. In this regard, the communication interface 104 may provide an interface to the first secure communication path so as to receive the cryptographic context. Upon receiving the cryptographic context at the communication interface 104, the communication interface 104 may send the cryptographic context to the processor 102 via the connection mechanism 108. Alternatively, upon receiving the cryptographic context at the communication interface 104, the communication interface 104 may send the cryptographic context to the data storage 106 via the connection mechanism 108.

Next, block 404 includes storing the cryptographic context at the message server. Storing the cryptographic context at the message server comprises storing the cryptographic context at data storage of the message server, such as the data storage 106. After receiving the cryptographic context at the communication interface 104, the communication interface 104 can send the cryptographic context to the data storage 106 via the connection mechanism 108. Alternatively, the processor 102 may receive the cryptographic context from the communication interface 104, and in turn, send the cryptographic context to the data storage 106 via the connection mechanism 108.

The processor 102 may execute program instructions for determining a data storage address (or address range) where the cryptographic context should be stored in the data storage 106. The processor 102 may execute program instructions for directing the data storage 106 to store the cryptographic context at the determined address (or address range). The determined address (or address range) may be associated with a party (e.g., a called party) to whom the encrypted message is to be delivered.

The processor 102 may execute program instructions for encrypting at least a portion of the cryptographic context (received by the message server) prior to storing the cryptographic context at the message server 100. In this way, at least a portion of the cryptographic context stored at the message server 100 will be encrypted by the message server 100. The entire cryptographic context or certain portions of the cryptographic context may be encrypted by the message server 100. As an example, for a cryptographic context that comprises both an encryption/decryption key and a salt value, only the encryption/decryption key may be encrypted at the message server 100.

The processor 102 may also execute program instruction to decrypt the at least a portion of the cryptographic context that is encrypted by the processor 102 (i.e., by the processor executing the program instructions to encrypt the at least a portion of the cryptographic context). Other examples of encrypting only a portion of the cryptographic context at the message server are also possible.

Next, block 406 includes receiving at the message server, the message that is encrypted according to the cryptographic context. The message server receives the encrypted message at the communication interface of the message server. The encrypted message is encrypted by an encrypting end device. The encrypting end device transmits the encrypted message to a communication path for transmission of the encrypted message to the message server via the communication path. As an example, the communication path that carries the encrypted message to the message server may comprise the first secure communication path (established at block 400 above). The encrypting end device may send the encrypted message before, while, or after sending the cryptographic context to the first secure communication path. As another example, the communication path that carries the encrypted message to the message server may comprise a non-secure communication path. Other examples of the communication path that carries the encrypted message to the message server are also possible.

Transmission of the encrypted message through the communication path may occur according to any of a variety of transport protocols. For example, transmission of the encrypted message may occur according to an SRTP. As another example, transmission of the encrypted message may occur according to an RTP. Other examples of transport protocols used to transmit the encrypted message are also possible.

The message server receives the encrypted message at a communication interface of the message server. Upon receiving the encrypted message at the communication interface 104, the communication interface 104 may send the encrypted message to the processor 102 via the connection mechanism 108. Alternatively, upon receiving the encrypted message at the communication interface 104, the communication interface 104 may send the encrypted message to the data storage 106 via the connection mechanism 108.

Next, block 408 includes storing the encrypted message at the message server. Storing the encrypted message at the message server comprises storing the encrypted message in the form that the message is received at the message server, i.e., without decrypting the encrypted message. Storing the encrypted message at the message server includes storing the encrypted message at data storage of the message server, such as the data storage 106.

The processor 102 may execute program instructions for determining a data storage address (or address range) where the encrypted voice mail message should be stored in the data storage 106. The processor 102 may execute program instructions for directing the data storage 106 to store the encrypted voice mail message at the determined address (or address range). The determined address (or address range) may be associated with a party (e.g., a called party) to whom the encrypted message is to be delivered.

Next, block 410 includes establishing a second secure communication path between a decrypting end device and the message server. The second secure communication path may be arranged according to any of a variety of protocols for establishing a secure communication path. For example, the second secure communication path may be arranged as a TLS secure communication path that is arranged according to a TLS protocol or as a VPN that allows data to be tunneled between the message server and the decrypting end device. Other examples of protocols for establishing the second secure communication path are also possible.

The decrypting end device comprises means for (i) initiating establishment of the second secure communication path, (ii) using the cryptographic context to decrypt the encrypted message, and (iii) receiving the encrypted message and/or the cryptographic context from the message server via the second secure communication path. Various devices may function as the decrypting end device. For example, the decrypting end device may be arranged as (i) the first gateway 310, (ii) the voice-over-packet telephone 318, or (iii) the voice-over-packet terminal adapter 320. Other examples of devices that may function as the decrypting end device are also possible.

The decrypting end device may comprise the encrypting end device that establishes the first secure communication path with the message server 316. Alternatively, the decrypting end device may comprise a device other than the encrypting end device. Other examples of devices that may function as the decrypting end device to initiate establishing the second secure communication path are also possible.

The decrypting end device and the message server can each comprise means for negotiating the establishment of the second secure communication path. Negotiations to establish the second secure communication path can take place between the decrypting end device and the message server. As an example, the negotiations may be carried out by communicating TLS protocol messages between the decrypting end device and the message server.

The decrypting end device may initiate establishing the second secure communication path in response to receiving signals sent from a second remote telephone device. The second remote telephone device may send signals addressed to the message server where the called party has a voice mail account. Examples of the second remote telephone device include the first circuit-switched telephone 324 and the wireless communication device 326.

Preferably, the second secure communication path is established prior to transmission of the cryptographic context from the message server to the decrypting end device. In this way, the cryptographic context may be sent to the decrypting end device via the second secure communication path.

A second communication session is established between the message server and the decrypting end device. Preferably, the second communication session is established after the second secure communication path is established. Establishment of the second communication session may occur by communicating signaling protocol messages between the message server and the decrypting end device via the second secure communication path or via a non-secure communication path. By way of example, the signaling protocol messages used to establish the second communication session may comprise SIP messages or H.323 protocol messages. Other examples of signaling protocol messages used to establish the second communication session are also possible.

Next, block 412 includes receiving at the message server, a request for transmission of the stored encrypted message to a decrypting end device. The request for transmission of the stored encrypted message may be sent by the decrypting end device to the message server during the second communication session.

The request for transmission of the stored encrypted message may be sent after the message server verifies that a user of the decrypting end device is allowed to access an encrypted message stored at the message server. Verification of the user may include the message server (i) receiving a password from the decrypting end device, and (ii) comparing the received password to the user's password stored at the message server so as to verify the received password is equivalent to the store password.

Next, block 414 includes transmitting the stored cryptographic context and the stored encrypted message to the decrypting end device, for decryption of the encrypted message at the decrypting end device. Decryption of the encrypted message results in the formation of a decrypted message. Transmission of the encrypted message and the cryptographic context to the decrypting end device may occur in response to the message server receiving the request for transmission of the stored encrypted message to the decrypting end device.

Transmission of the cryptographic context and the encrypted message may occur according to any of a variety of methods. As an example, transmission of cryptographic context and the encrypted message may comprise transmitting the cryptographic context and then transmitting the encrypted message. As another example, transmission of the cryptographic context and the encrypted message may comprise transmitting at least a portion of the cryptographic context and the encrypted message simultaneously (e.g., in a single data packet).

As yet another example, transmission of the cryptographic context and the encrypted message may comprise sending (i) a first part of the cryptographic context (e.g., a first encryption/decryption key), followed by a first portion of the encrypted message that is encrypted according to the first part of the cryptographic context, and then (ii) a second part of the cryptographic context (e.g., a second encryption/decryption key), followed by a second portion of the encrypted message that is encrypted according to the second part of the cryptographic context. Other examples of transmitting the cryptographic context and the encrypted message are also possible.

Various transmission protocols may be used to transmit the encrypted message to the decrypting end device. For example, the transmission protocol may comprise the SRTP protocol or the RTP protocol. Other examples of the transmission protocol for transmitting the encrypted message and the cryptographic context are also possible.

Various methods may be used to decrypt an encrypted message. For example, after the decrypting end device receives the cryptographic context and the entire encrypted message, the decrypting end device can decrypt the encrypted message using the cryptographic context. Alternatively, as another example, after the decrypting end device receives the cryptographic context and starts to receive the encrypted message, the decrypting end device can decrypt the encrypted message in real-time as it is received without waiting for the entire encrypted message to be received by the decrypting end device.

After the decrypting end device has decrypted the encrypted message (or a first portion of the encrypted message), the decrypting end device may present the decrypted message to a user of the decrypting end device. As an example, presenting a decrypted voice-mail message to the user of the decrypting end device may include (i) sending the decrypted voice-mail message to a vocoder, (ii) converting the decrypted voice-mail message at the vocoder to a speaker signal, and (iii) sending the speaker signal to a speaker of the decrypting end device, so as to produce an audible version of the decrypted message at the speaker. Other examples of presenting a decrypted message to a user of a decrypting end device are also possible.

4. Conclusion

Exemplary embodiments of the present invention have been described above. Those skilled in the art will understand, however, that changes and modifications may be made to the embodiment described without departing from the true scope and spirit of the present invention, which is defined by the claims.

We claim:

1. A method for offloading message encryption and message decryption from a message server to an encrypting end device and a decrypting end device that are remote from the message server, the method comprising:

the message server establishing a secure communication path between the message server and the encrypting end device;

the message server receiving, from the encrypting end device via the secure communication path between the message server and the encrypting end device, a cryptographic context usable by the encrypting end device to encrypt a message and the message server responsively storing the cryptographic context;

the message server receiving an encrypted message from the encrypting end device via a communication path between the message server and the encrypting end device, but other than the secure communication path between the message server and the encrypting end device, and the message server responsively storing the encrypted message, wherein the encrypting end device creates the encrypted message by encrypting a message with the cryptographic context;

the message server receiving a request for the message server to transmit the encrypted message to the decrypting end device; and in response to receiving the request, the message server transmitting the cryptographic context and the encrypted message to the decrypting end device for decryption of the encrypted message by the decrypting end device, wherein transmitting the cryptographic context to the decrypting end device occurs via a secure communication path established between the message server and the decrypting end device.

2. The method of claim 1, wherein the secure communication path between the message server and the encrypting end device comprises a first Transport Layer Security (TLS) secure communication path arranged according to a TLS protocol, and the secure communication path established between the message server and the decrypting end device comprises a second TLS secure communication path arranged according to the TLS protocol.

3. The method of claim 2, further comprising:
the message server using one or more Session Initiation Protocol (SIP) messages to establish a first communication session between the message server and the encrypting end device,
wherein the encrypted message is transmitted to the message server from the encrypting end device using a Secure Real-time Transport Protocol (SRTP) during the first communication session.

4. The method of claim 3, further comprising:
the message server using one or more SIP messages to establish a second communication session between the message server and the decrypting end device,
wherein the message server transmitting the encrypted message to the decrypting end device occurs during the second communication session and in accordance with the SRTP.

5. The method of claim 2, further comprising:
the message server using one or more H.323 protocol messages to establish a first communication session between the message server and the encrypting end device,
wherein the encrypted message is transmitted to the message server from the encrypting end device using a Secure Real-time Transport Protocol (SRTP) during the first communication session.

6. The method of claim 5, further comprising:
the message server using one or more H.323 protocol messages to establish a second communication session between the message server and the decrypting end device,
wherein the stored encrypted message is transmitted to the decrypting end device from the message server using the SRTP during the second communication session.

7. The method of claim 1, further comprising:
the message server encrypting at least a portion of the cryptographic context such that at least a portion of the stored cryptographic context is encrypted by the message server.

8. The method of claim 7, further comprising:
the message server decrypting the at least a portion of the cryptographic context encrypted by the message server.

9. The method of claim 1, further comprising:
the message server (i) establishing a communication session with the decrypting end device, and (ii) verifying that a user of the decrypting end device is allowed to access the stored encrypted message.

10. The method of claim 1, wherein the encrypted message comprises a voice message arranged as encoded speech.

11. The method of claim 1, wherein the encrypted message comprises a video message.

12. The method of claim 1, wherein the cryptographic context is selected from the group consisting of (i) an encryption/decryption key, (ii) a salt value, and (iii) an encryption scheme identifier.

13. The method of claim 1, wherein the cryptographic context comprises a plurality of encryption/decryption keys, wherein each of the plurality of encryption/decryption keys is associated with the encrypted message.

14. The method of claim 1, further comprising:
the decrypting end device decrypting the encrypted message according to the cryptographic context so as to produce a decrypted version of the encrypted message; and
the decrypting end device presenting the decrypted version of the encrypted message to a user of the decrypting end device.

15. A method for offloading message encryption and message decryption from a message server to an encrypting end device and a decrypting end device that are remote from the message server, the method comprising:
the message server establishing a secure communication path on a packet-network between the message server and the encrypting end device;
the message server receiving, from the encrypting end device via the secure communication path on the packet-network between the message server and the encrypting end device, a cryptographic context useable by the encrypting end device to encrypt a message and the message server responsively storing the cryptographic context, wherein the message server and the encrypting end device are coupled to the packet-network;
the message server receiving an encrypted message from the encrypting end device via a path on the packet-network between the message server and the encrypting end device, but other than the secure communication path on the packet-network between the message server and the encrypting end device, and the message server responsively storing the encrypted message, wherein the encrypting end device creates the encrypted message by encrypting a message with the cryptographic context, and wherein storing the encrypted message includes storing the encrypted message as encrypted by the encrypting end device;
the message server receiving, from the decrypting end device via the packet-network, a request for the message server to transmit the encrypted message to the decrypting end device, wherein the decrypting end device is coupled to the packet-network; and
in response to receiving the request, the message server transmitting the cryptographic context and the encrypted message to the decrypting end device for decryption of the encrypted message by the decrypting end device, wherein transmitting the cryptographic context to the decrypting end device occurs via a secure communication path established on the packet-network between the message server and the decrypting end device.

16. The method of claim 15, wherein the encrypting end device and the decrypting end device are both Voice over Internet Protocol (VoIP) telephones.

17. A method for offloading message encryption and message decryption from a message server to an encrypting end device and a decrypting end device that are remote from the message server, the method comprising:
the message server negotiating with an encrypting end device to establish a first secure communication path, the first secure communication path being between the message server and the encrypting end device;
the message server receiving, from the encrypting end device via the first secure communication path between the message server and the encrypting end device, a cryptographic context useable by the encrypting end device to encrypt a message, and the message server responsively storing the cryptographic context;

the message server receiving an encrypted message from the encrypting end device via a communication path between the message server and the encrypting end device, but other than the first secure communication path between the message server and the encrypting end device, and the message server responsively storing the encrypted message, wherein the encrypting end device creates the encrypted message by encrypting a message with the cryptographic context;

the message server negotiating with a decrypting end device to establish a second secure communication path, the second secure communication path being between the message server and the decrypting end device;

the message server receiving a request for the message server to transmit the encrypted message to the decrypting end device; and in response to receiving the request for the message server to transmit the encrypted message to the decrypting end device, the message server transmitting the cryptographic context to the decrypting end device via the second secure communication path and transmitting the encrypted message to the decrypting end device for decryption of the encrypted message by the decrypting end device.

18. A method for offloading message encryption and message decryption from a message server to an encrypting end device and a decrypting end device that are remote from the message server, the method comprising:

the message server establishing a secure communication path between the message server and the encrypting end device;

the message server receiving, from the encrypting end device via the secure communication path between the message server and the encrypting end device, a cryptographic context useable by the encrypting end device to encrypt a message in real-time as the message is being created, and the message server responsively storing the cryptographic context;

the message server receiving an encrypted message from the encrypting end device via a communication path between the message server and the encrypting end device, but other than the secure communication path between the message server and the encrypting end device, and the message server responsively storing the encrypted message, wherein the encrypting end device creates the encrypted message by encrypting a message with the cryptographic context;

the message server receiving a request for the message server to transmit the encrypted message to the decrypting end device; and in response to receiving the request, the message server transmitting the cryptographic context and the encrypted message to the decrypting end device, for decryption of the encrypted message by the decrypting end device, wherein transmitting the cryptographic context to the decrypting end device occurs via a secure communication path established between the message server and the decrypting end device.

19. The method of claim 17, wherein the first secure communication path is arranged as a virtual private network (VPN).

* * * * *